Sept. 25, 1923.

J. S. O'HARA 1,468,729

AUTOMATIC REGULATOR

Filed Sept. 3, 1920

Inventor
Joseph S. O'Hara
Church & Church
By
His Attorneys

Patented Sept. 25, 1923.

1,468,729

UNITED STATES PATENT OFFICE.

JOSEPH S. O'HARA, OF ROMNEY, WEST VIRGINIA.

AUTOMATIC REGULATOR.

Application filed September 3, 1920. Serial No. 408,106.

*To all whom it may concern:*

Be it known that I, JOSEPH S. O'HARA, a citizen of the United States, residing at Romney, county of Hampshire, and State of West Virginia, have invented new and useful Improvements in Automatic Regulators; and I do hereby declare the following to be a full, clear, and exact description of the same, reference being had to the accompanying drawings, forming part of this specification.

This invention relates to mechanisms for the automatic regulation of power in any form by mechanism set in action by the closing of a high voltage circuit by means of the pointer or indicator of a measuring instrument of any kind.

The object of the present invention is to provide a novel and simple mechanism for altering power so as to automatically keep it at or near a predetermined normal of temperature, speed, pressure, frequency, quantity or vacuum.

A further object of my invention is to provide an automatic voltage regulator in which air gaps are provided between the movable indicator of a voltmeter and a pair of adjustably spaced terminals which may be set for a predetermined maximum and minimum voltage, such terminals being connected to a normally open high voltage low amperage circuit having in it a plurality of step down transformers or other electrical means for operating mechanism for boosting or bucking the main line voltage in order to keep the voltage at the load within the predetermined limits.

In the following description the system has been described in its preferred form as adapted for voltage regulation, but it should be distinctly understood that the invention contemplates not only the use of any known mechanism for the alteration of the current, but includes the use of a measuring instrument of any type whatsoever, such for example, as a thermometer, in which case the "power" to be controlled would be the temperature at the proper point; or an air pressure gage, in which case the governing means would alter the air pressure; or a speed indicator, in which case movement of the indicator would operate a mechaniical speed regulator or governor of any of the well known types, etc.

The device which I hereafter describe as an indicating mechanism, in addition to the apparatus mentioned, may be an ammeter, wattmeter, power factor meter, synchronism indicator, steam gage, time indicator, speed indicator, vacuum indicator, etc., the principle in each case being the same, to-wit, that a needle or similar shaped contact member on or part of the moving element of the meter is caused to be moved by some change in pressure, speed, temperature, etc., of the system to which it is connected, and having once been moved within sparking distance of one of the terminals of the normally open circuit, it will cause a stream of sparks to pass between the contact and the terminal because of the high potential which exists between these members when the circuit is thus closed.

Figure 1:
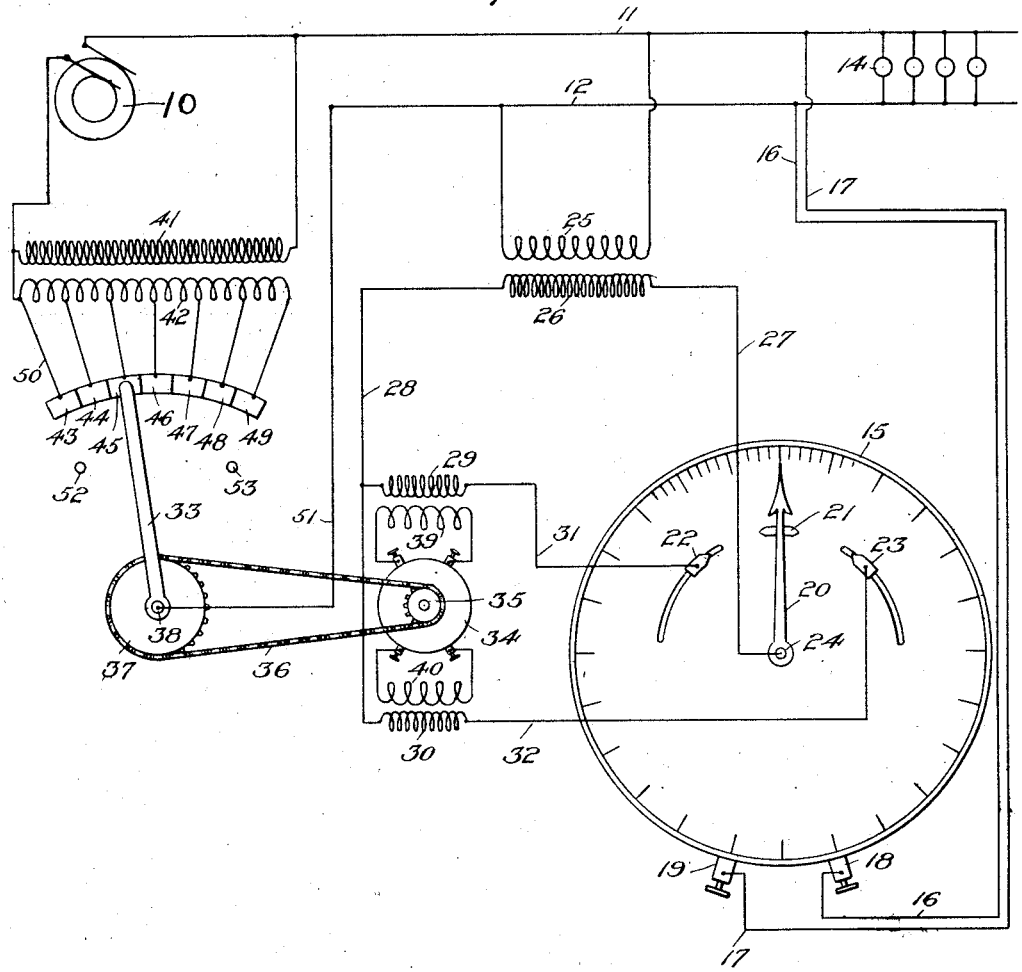
Figure 1 is a diagrammatic view of my device in its preferred form as designed for voltage regulation.

As shown in Figure 1, current derived from any source as the generator 10 is supplied through the mains 11 and 12, to a load represented as a plurality of lamps 14, which load it is desired should be kept at as nearly a uniform voltage as is possible to maintain.

The voltmeter 15 is connected across the mains 11 and 12 by means of wires 16 and 17 leading respectively to the binding posts 18 and 19 of the voltmeter. The indicator 20 of the voltmeter is of the usual type, but carries as an integral element, or otherwise, a contact piece 21 preferably pointed at either end, and a suitable material to withstand severe sparking. Just back of the path of the contact member 21 are secured the terminals 22 and 23 of a normally open circuit, these terminals being adjustably mounted in arcuate slots corresponding to the path of movement of the contact member 21, so that these terminals may be set to regulate the voltage within any desired limits subject only to the capacity of the voltmeter.

The primary coil 25 of a transformer is connected across the mains 11 and 12 and the corresponding secondary 26 is connected by means of the wire 27 with the shaft 24 of the voltmeter needle 20 at one end, and at the other is connected by means of the wire 28 with primary coils 29 and 30, connected respectively to the insulated adjustable terminals 22 and 23 by means of the wires 31 and 32.

A motor 34 having a plurality of reversed coils is connected to the secondary coils 39 and 40, operating to turn the motor in clockwise direction when the transformer 29—39 is energized and to turn the motor 34 in the opposite or counter-clockwise direction when a current is produced in the transformer 30—40.

The motor 34 is provided with a small sprocket wheel 35 connected by means of a chain 36 to a large sprocket wheel 37 fixed to the shaft 38 carrying the movable contact arm 33 of an adjustable transformer. The primary coil 41 of this transformer is connected between the generator and the main 11, while the secondary 42 is connected at one end to the generator 10 and is tapped to the various segments 43 to 49 in the usual fashion, so that when the arm 33 is on the contact segment 43 current will be conveyed to the load 14 by the wire 11 and by the wire 50 leading to the primary 41, secondary 42 and contact piece 43, and from thence through the arm 33 to the wire 51 leading from the shaft 38 to the main 12.

The action of the apparatus is as follows: When the voltage between the mains 11 and 12 drops lower than it is desired for the lamps 14, the indicator 20 drops backward toward the contact 22 and as soon as the contact piece 21 attached to the indicator 20 gets within sparking distance of the terminal 22 a stream of sparks will pass between the needle or contact 21 and the terminal 22, these sparks being produced by the high voltage given by the fine coil 26 of the transformer 25—26.

A current will thus be made to flow through the wire 27, coil 26, wire 28, primary coil 29, wire 31 and terminal 22, the result being that a current of much lower voltage will be generated in the secondary 39 of the transformer 29—39. This low voltage current is suitable for the windings of the motor 34 and causes the same to move in a clockwise direction, thus causing a clockwise movement of the arm 33, which in the position shown in Figure 1 would cause the movement of said arm from contact with segment 45 to the segments 46, 47, 48, etc., depending upon the length of time the transformer 29—39 was energized. The effect of this movement of the arm 33 is to cut in additional sections of the secondary coil 42, thus increasing the voltage between the mains 11 and 12, and consequently that supplied to the load 14.

As soon as the predetermined normal voltage has been reached by such boosting by the coils 42, the indicator 20 will swing back to normal or mid-position, as shown in Fig. 1, and since the sparks can no longer jump the air gap between the contact 21 and the terminal 22, the current through the coils 26 and 29 will cease to flow, so that the transformer 29—39 will become dead and the motor 34 will cease to operate, thus leaving the arm 33 in its altered position, since there is no tendency of such arm to move except as controlled by its connection with motor 34.

With the parts in the thus adjusted position, if the voltage should for any reason now become too high between the mains 11 and 12, the indicator 20 would carry the contact member 21 into proximity to the terminal 23 with the result that a stream of sparks will be caused to flow between the indicator and the terminal 23, thus completing a circuit through the wire 32, primary 30, wire 28, secondary 26, and wire 27, which has the effect of causing a low voltage current to flow through the secondary 40 which is connected to an oppositely wound coil in the motor 34 from that connected with the secondary 39. The flow of current, therefore, through the secondary 40 will cause the motor 34 to rotate in a counter-clockwise direction and to rotate the arm 33, by means of the chain and sprocket connection, to the left as shown in Figure 1; that is, to alter the direction of the arm toward the initial segment 43 until a sufficient number of coils 42 have been cut out of circuit in the transformer 41—42, so that its boosting effect will be lowered until the lamp voltage has again reached its pre-determined normal at which time the indicator 20 will be in mid-position and the stream of sparks between the contact 21 and terminal 23 will have been interrupted with a consequent deenergizing of the transformer 30—40. As previously stated, upon the cessation of movement of the motor 34, the arm 33 will remain in adjusted position without tendency to move therefrom. If desired, a pair of stop pins 52—53 may be inserted in the path of the arm 33 to prevent its overrunning the arc 43—49.

The essential point of the system is the turning on of a high voltage current of low amperage by means of the movement of an element, such as an indicator of a regulating or measuring instrument, such indicator being so arranged that it brings two conducting members within sparking distance of each other whenever an adjustment is desired, the high voltage current thus produced being then utilized to operate mechanism of any desired type, which mechanism in turn furnishes the power for making the desired adjustment.

Figure 2:
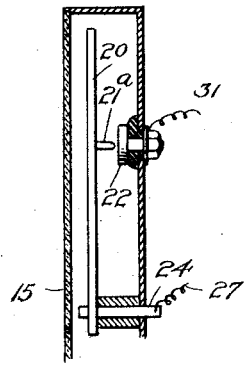
Fig. 2 shows a slightly modified form of contact.

In the modification shown in Figure 2, the indicator 20 carries a needle contact 21$^a$ adapted to pass the terminals 22 and 23 without actual physical engagement. The modified apparatus is in all other respects the same as previously described.

The detailed description of the various portions of the apparatus mentioned in the specification is merely for clearness of illustration of the invention and such details may be departed from to considerable extent without departing from the spirit of the invention.

What I claim is:

1. A movable indicator, a contact element on either side of said indicator when in normal position and in proximity to its path of movement, a transformer having a secondary coil connected to said indicator, a primary coil individual to each contact element and connected in parallel to the secondary of the transformer, and means including a pair of secondary coils governed by the passage of current through said contact primaries for returning said indicator to normal position.

2. In combination a pair of current carrying mains, a voltmeter across said mains, a motor, a normally open circuit including two terminals, a transformer across said mains and a pair of transformers connected to said motor and arranged in parallel, between said terminals and the transformer across the mains, means connected to said motor and movable in one direction by a flow of current through one of said transformers and in opposite direction by flow through the other of said transformers, and voltage regulating means connected to said mains and responsive to movement of the indicator of the voltmeter.

3. A power operated indicating mechanism responsive to changes in such power, a normally open circuit having two spaced terminals, a contact member carried by said indicating mechanism movable past each of said terminals but passing within sparking distance of one terminal or the other upon fluctuation of said power from a predetermined normal, means for impressing a sufficiently high voltage in said circuit to jump the gap between said indicating mechanism and one of said terminals at a predetermined variation of the power from normal, and power regulating means governed by the flow of current through said high voltage circuit.

JOSEPH S. O'HARA.